(12) United States Patent
Brennan et al.

(10) Patent No.: US 11,710,207 B2
(45) Date of Patent: Jul. 25, 2023

(54) WAVE THROTTLING BASED ON A PARAMETER BUFFER

(71) Applicant: ADVANCED MICRO DEVICES, INC., Santa Clara, CA (US)

(72) Inventors: Christopher J. Brennan, Boxborough, MA (US); Nishank Pathak, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/217,050

(22) Filed: Mar. 30, 2021

(65) Prior Publication Data

US 2022/0318944 A1    Oct. 6, 2022

(51) Int. Cl.
*G06T 1/20*      (2006.01)
*G06F 9/54*      (2006.01)

(52) U.S. Cl.
CPC ............... *G06T 1/20* (2013.01); *G06F 9/542* (2013.01); *G06F 9/544* (2013.01)

(58) Field of Classification Search
CPC ............ G06T 1/20; G06F 9/542; G06F 9/544
See application file for complete search history.

(56) References Cited

U.S. PATENT DOCUMENTS

| 7,594,095 B1* | 9/2009 | Nordquist ............. G06F 9/4843 712/22 |
| 9,594,560 B2 | 3/2017 | Ananthakrishnan et al. |
| 9,965,321 B2* | 5/2018 | Duluk, Jr. ............. G06F 9/4843 |
| 2006/0139365 A1 | 6/2006 | Naoi |
| 2006/0161762 A1 | 7/2006 | Eisen et al. |
| 2007/0139421 A1 | 6/2007 | Chen et al. |
| 2009/0033672 A1 | 2/2009 | Jiao et al. |
| 2009/0150657 A1 | 6/2009 | Gschwind et al. |

(Continued)

FOREIGN PATENT DOCUMENTS

| KR | 10-2012-0064093 A | 6/2012 |
| KR | 10-2014-0039076 A | 3/2014 |
| KR | 10-2017-0021312 A | 2/2017 |

OTHER PUBLICATIONS

Notice of Allowance issued in U.S. Appl. No. 17/121,965 dated Jul. 19, 2022, 5 pages.
Non-Final Rejection dated Jul. 30, 2021 in U.S. Appl. No. 17/123,978 17 pages.
U.S. Appl. No. 17/123,978, filed Dec. 16, 2020 in the name of Nishank Pathak et al.

(Continued)

*Primary Examiner* — Jacinta M Crawford
*Assistant Examiner* — Donna J. Ricks (57) ABSTRACT

A graphics pipeline includes a first shader that generates first wave groups, a shader processor input (SPI) that launches the first wave groups for execution by shaders, and a scan converter that generates second waves for execution on the shaders based on results of processing the first wave groups the one or more shaders. The first wave groups are selectively throttled based on a comparison of in-flight first wave groups and second waves pending execution on the at least one second shader. A cache holds information that is written to the cache in response to the first wave groups finishing execution on the shaders. Information is read from the cache in response to read requests issued by the second waves. In some cases, the first wave groups are selectively throttled by comparing how many first wave groups are in-flight and how many read requests to the cache are pending.

20 Claims, 6 Drawing Sheets

(56) References Cited

U.S. PATENT DOCUMENTS

| | | |
|---|---|---|
| 2009/0295804 A1 | 12/2009 | Goel et al. |
| 2011/0037769 A1 | 2/2011 | Chen et al. |
| 2012/0096474 A1 | 4/2012 | Jiao |
| 2013/0021360 A1* | 1/2013 | Gruber .................. G06F 9/52 345/589 |
| 2013/0169634 A1 | 7/2013 | Goel et al. |
| 2013/0169636 A1 | 7/2013 | Yang et al. |
| 2014/0092092 A1 | 4/2014 | Li |
| 2014/0098117 A1 | 4/2014 | Goel et al. |
| 2014/0285500 A1 | 9/2014 | Lindholm et al. |
| 2015/0221063 A1 | 8/2015 | Kim et al. |
| 2015/0348226 A1 | 12/2015 | Vaishampayan et al. |
| 2016/0148424 A1 | 5/2016 | Chung et al. |
| 2017/0031708 A1 | 2/2017 | Chen et al. |
| 2017/0249149 A1 | 8/2017 | Priyadarshi et al. |
| 2017/0372506 A1* | 12/2017 | Surti .................. G06T 15/80 |
| 2018/0211435 A1 | 7/2018 | Nijasure et al. |
| 2019/0042410 A1 | 2/2019 | Gould et al. |
| 2019/0129756 A1 | 5/2019 | Kazakov et al. |
| 2019/0236749 A1* | 8/2019 | Gould .................. G06T 1/20 |
| 2019/0259193 A1 | 8/2019 | Harris et al. |
| 2019/0266069 A1 | 8/2019 | Schluessler et al. |
| 2019/0317807 A1 | 10/2019 | Basu et al. |
| 2020/0004460 A1 | 1/2020 | Gould et al. |
| 2020/0098082 A1 | 3/2020 | Gutierrez et al. |
| 2021/0049729 A1 | 2/2021 | Paltashev et al. |

OTHER PUBLICATIONS

U.S. Appl. No. 17/121,965, filed Dec. 15, 2020 in the name of Nishank Pathak et al.
International Search Report and Written Opinion dated Apr. 1, 2022 for PCT/US2021/063251, 10 pages.
Non-Final Office Action dated Mar. 18, 2022 for U.S. Appl. No. 17/121,965, 12 pages.
Hao Wang et al., "Memory scheduling towards high-throughput cooperative heterogeneous computing,"23rd International Conference on Parallel Architecture and Compilation Techniques (PACT), IEEE, 2014, 11 pages.
International Search Report and Written Opinion dated Jun. 2, 2022 for PCT/US2022/017156, 10 pages.
International Search Report and Written Opinion dated Mar. 3, 2022 for PCT/US2021/061387, 8 pages.
Final Office Action dated Feb. 28, 2022 for U.S. Appl. No. 17/123,978, 16 pages.
Chih-Chieh Hsiao et al., "Demand Look-Ahead Memory Access Scheduling for 3D Graphics Processing Units", Springer Science Business Media New York, Aug. 6, 2013, pp. 1391-1416.
Final Office Action issued in U.S. Appl. No. 17/123,978, dated Jan. 26, 2023, 22 pages.
Non-Final Office Action issued in U.S. Appl. No. 17/123,978, dated Sep. 8, 2022 26 pages.

* cited by examiner

WAVE THROTTLING BASED ON A PARAMETER BUFFER

BACKGROUND

Graphics processing units (GPUs) implement graphics processing pipelines that concurrently process copies of commands that are retrieved from a command buffer. GPUs and other multithreaded processing units typically implement multiple processing elements (which are also referred to as processor cores or compute units) that concurrently execute multiple instances of a single program on multiple data sets as a single wave. A hierarchical execution model is used to match the hierarchy implemented in hardware. The execution model defines a kernel of instructions that are executed by all the waves (also referred to as wavefronts, threads, streams, or work items). The graphics pipeline in a GPU includes one or more shaders that execute using resources of the graphics pipeline such as compute units, memory, and caches. The graphics pipeline is typically divided into a geometry portion that performs geometry operations on patches or other primitives that represent portions of an image. The shaders in the geometry portion can include vertex shaders, hull shaders, domain shaders, and geometry shaders. The geometry portion of the graphics pipeline completes when the primitives produced by the geometry portion of the pipeline are rasterized (e.g., by one or more scan converters) to form sets of pixels that represent portions of the image. Subsequent processing on the pixels is referred to as pixel processing and includes operations performed by shaders such as a pixel shader executing using resources of the graphics pipeline.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Prior to dispatching a wave group (which includes one or more waves) for processing by one or more shaders implemented by compute units in a shader hub, a geometry engine reserves space in a memory or cache to store output generated by processing the wave group in the shaders. For example, the geometry engine can transmit a reservation request to a PC manager for space to hold a parameter buffer. The PC manager reserves the requested space in a level 2 (L2) cache and returns information identifying the reserved space in the L2 cache to the geometry engine. In response to receiving the reservation confirmation, the geometry engine provides the wave group to a shader processor input (SPI) that launches the wave group for processing by compute units in the shader hub. Attributes from the shader output are stored in the reserved space in the L2 cache. Positions are provided to a primitive assembler that assembles primitives (such as triangles) and sends the primitives to a scan converter via a primitive hub. The scan converter generates pixel waves that are returned to the SPI, which fetches the attributes from the L2 cache. The compute units in the shader hub then perform pixel processing on the pixel waves using the attributes retrieved from the L2 cache. Thus, there is a dependency between the graphics shader wave groups generated by the geometry engine and the pixel waves generated by the scan converter. This dependency can starve other data types of space in the L2 cache if the geometry engine launches too many wave groups that write too much data to the L2 cache, which leads to excessive cache thrashing and decreases the performance of the graphics pipeline.

FIGS. 1-6 disclose systems and techniques for reducing thrashing of a cache that is shared by geometry shaders and pixel shaders by selectively throttling geometry shader (GS) wave groups (or wave groups associated with other shaders such as a vertex shader) launched by a shader processor input (SPI) based on a comparison of in-flight GS work and pending pixel shader (PS) work generated by a scan converter. The scan converter provides the SPI with requests to read information from the cache. Some embodiments of the management circuitry maintain counters for the three events: (1) a first counter for launches of a GS wave group, (2) a second counter of GS wave groups that have finished executing on the shaders by writing to the cache, and (3) a third counter of numbers of requests to read from the cache for a PS wave generated by the scan converter. The counters are incremented in response to a corresponding event being written into a windowing first-in-first-out (FIFO) buffer and decremented in response to the corresponding event being read out of the windowing FIFO. The management circuitry determines the amount of in-flight GS work based on a difference between the first counter and the second counter. The management circuitry determines the amount of pending PS work based on a difference between the second counter and the third counter. The management circuitry throttles the wave groups launched by the SPI if the amount of in-flight GS work is higher than the amount of pending PS work. Otherwise, the SPI is free to launch wave groups according to algorithms such as a greedy algorithm. In some embodiments, the criterion for throttling wave groups is modified so that the management circuitry throttles the wave groups launched by the SPI if the amount of in-flight GS work is higher than the amount of pending PS work plus an additional factor to decrease the likelihood that throttling starves the graphics pipeline of work. For example, the additional factor can be determined based on measures of burstiness of the number of reads requested by the pending PS work.

Figure 1:
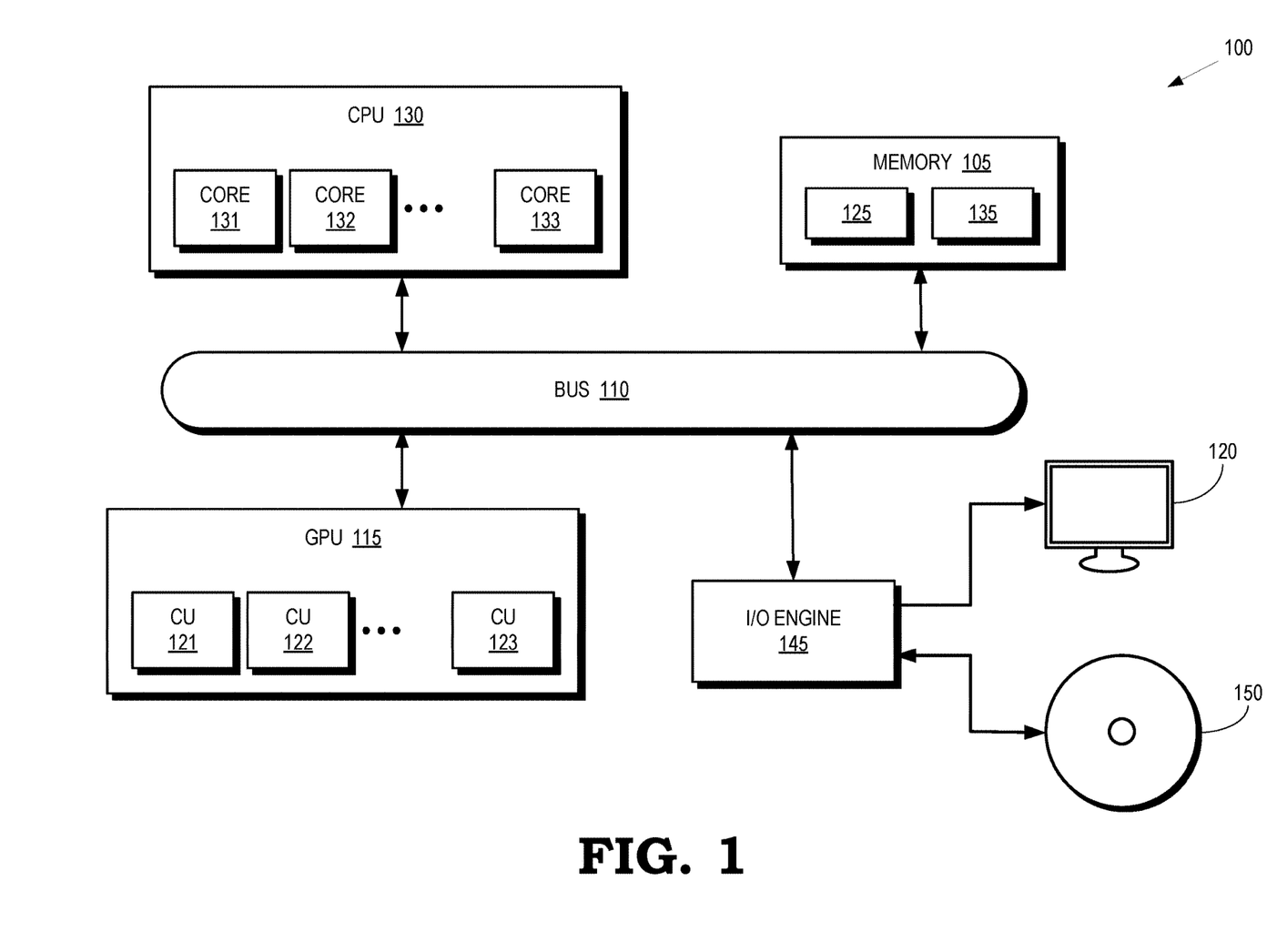
FIG. 1 is a block diagram of a processing system according to some embodiments.

FIG. 1 is a block diagram of a processing system 100 according to some embodiments. The processing system 100 includes or has access to a memory 105 or other storage component that is implemented using a non-transitory computer readable medium such as a dynamic random-access memory (DRAM). However, in some cases, the memory 105 is implemented using other types of memory including static random-access memory (SRAM), nonvolatile RAM, and the like. The memory 105 is referred to as an external memory since it is implemented external to the processing units implemented in the processing system 100. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The techniques described herein are, in different embodiments, employed at any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). FIG. 1 illustrates an example of a parallel processor, and in particular a graphics processing unit (GPU) 115, in accordance with some embodiments. The graphics processing unit (GPU) 115 renders images for presentation on a display 120. For example, the GPU 115 renders objects to produce values of pixels that are provided to the display 120, which uses the pixel values to display an image that represents the rendered objects. The GPU 115 implements a plurality of compute units (CU) 121, 122, 123 (collectively referred to herein as "the compute units 121-123") that execute instructions concurrently or in parallel. In some embodiments, the compute units 121-123 include one or more single-instruction-multiple-data (SIMD) units and the compute units 121-123 are aggregated into workgroup processors, shader arrays, shader engines, and the like. The number of compute units 121-123 implemented in the GPU 115 is a matter of design choice and some embodiments of the GPU 115 include more or fewer compute units than shown in FIG. 1. The compute units 121-123 can be used to implement a graphics pipeline, as discussed herein. Some embodiments of the GPU 115 are used for general purpose computing. The GPU 115 executes instructions such as program code 125 stored in the memory 105 and the GPU 115 stores information in the memory 105 such as the results of the executed instructions.

The processing system 100 also includes a central processing unit (CPU) 130 that is connected to the bus 110 and therefore communicates with the GPU 115 and the memory 105 via the bus 110. The CPU 130 implements a plurality of processor cores 131, 132, 133 (collectively referred to herein as "the processor cores 131-133") that execute instructions concurrently or in parallel. The number of processor cores 131-133 implemented in the CPU 130 is a matter of design choice and some embodiments include more or fewer processor cores than illustrated in FIG. 1. The processor cores 131-133 execute instructions such as program code 135 stored in the memory 105 and the CPU 130 stores information in the memory 105 such as the results of the executed instructions. The CPU 130 is also able to initiate graphics processing by issuing draw calls to the GPU 115. Some embodiments of the CPU 130 implement multiple processor cores (not shown in FIG. 1 in the interest of clarity) that execute instructions concurrently or in parallel.

An input/output (I/O) engine 145 handles input or output operations associated with the display 120, as well as other elements of the processing system 100 such as keyboards, mice, printers, external disks, and the like. The I/O engine 145 is coupled to the bus 110 so that the I/O engine 145 communicates with the memory 105, the GPU 115, or the CPU 130. In the illustrated embodiment, the I/O engine 145 reads information stored on an external storage component 150, which is implemented using a non-transitory computer readable medium such as a compact disk (CD), a digital video disc (DVD), and the like. The I/O engine 145 is also able to write information to the external storage component 150, such as the results of processing by the GPU 115 or the CPU 130.

The processing system 100 implements pipeline circuitry for executing instructions in multiple stages of the pipeline. The pipeline circuitry is implemented in some embodiments of the compute units 121-123 or the processor cores 131-133. In some embodiments, the pipeline circuitry including the compute units 121-123 is used to implement a graphics pipeline that executes shaders of different types including, but not limited to, vertex shaders, hull shaders, domain shaders, geometry shaders, and pixel shaders. Some embodiments of the processing system 100 include one or more caches that hold information written to the caches by the shaders in response to completing execution of waves or wave groups, such as geometry shader wave groups. The information written to the caches is subsequently read out during execution of other waves or wave groups such as pixel shader waves. Some embodiments of the geometry shader generate first wave groups and a shader processor input (SPI) launches the first wave groups for execution by the shaders. A scan converter generates second waves for execution on the shaders based on results of processing the first wave groups the one or more shaders. The first wave groups are selectively throttled based on a comparison of in-flight first wave groups and second waves pending execution on the at least one shader. The cache holds information that is written to the cache in response to the first wave groups finishing execution on the shaders. Information is read from the cache in response to read requests issued by the second waves. In some cases, the first wave groups are selectively throttled by comparing how many first wave groups are in-flight and how many read requests to the cache are pending.

Figure 2:
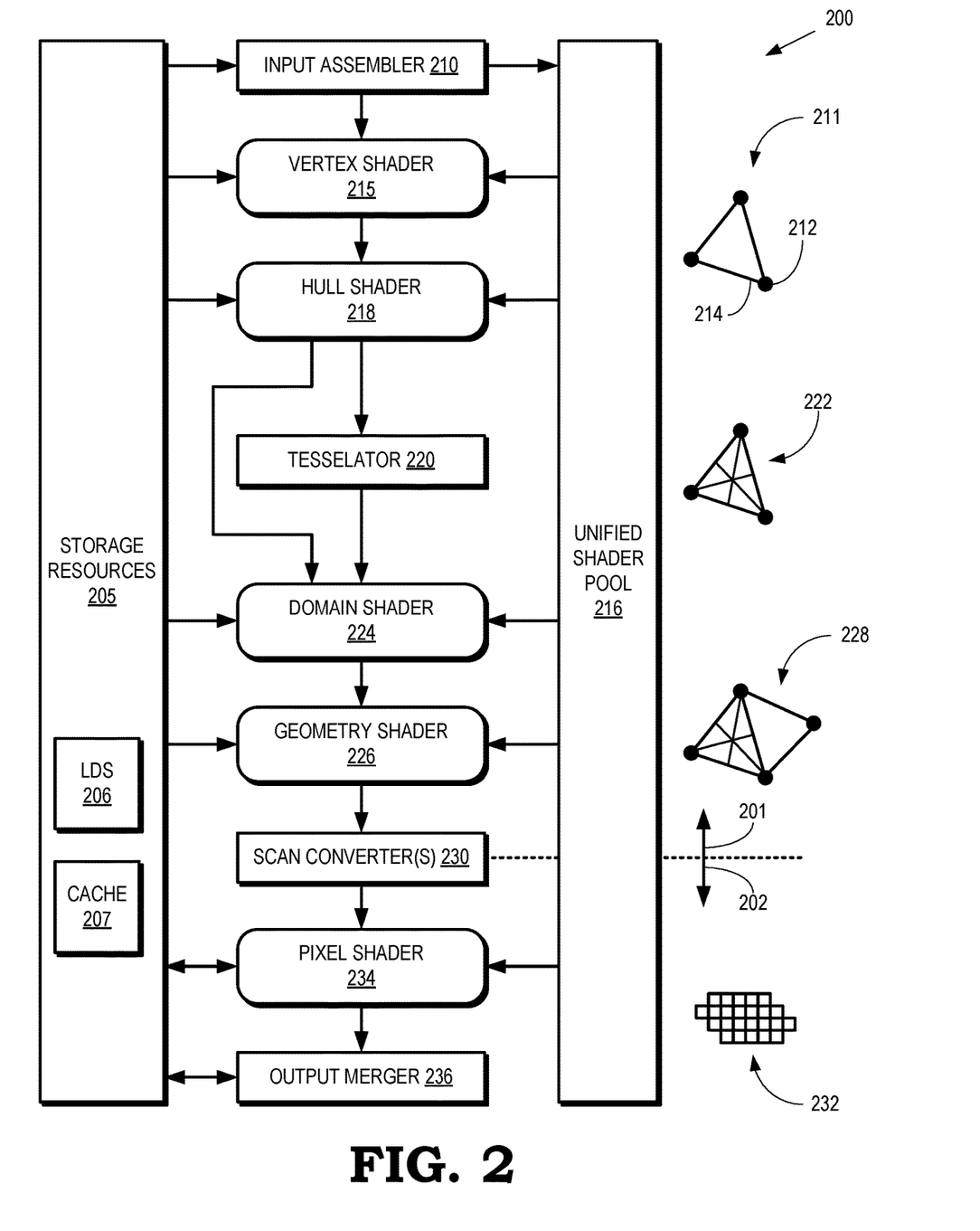
FIG. 2 depicts a graphics pipeline that is capable of processing high-order geometry primitives to generate rasterized images of three-dimensional (3D) scenes at a predetermined resolution according to some embodiments.

FIG. 2 depicts a graphics pipeline 200 that is capable of processing high-order geometry primitives to generate rasterized images of three-dimensional (3D) scenes at a predetermined resolution according to some embodiments. The graphics pipeline 200 is implemented in some embodiments of the processing system 100 shown in FIG. 1. The illustrated embodiment of the graphics pipeline 200 is implemented in accordance with the DX11 specification. Other embodiments of the graphics pipeline 200 are implemented in accordance with other application programming interfaces (APIs) such as Vulkan, Metal, DX12, and the like. The graphics pipeline 200 is subdivided into a geometry processing portion 201 that includes portions of the graphics pipeline 200 prior to rasterization and a pixel processing portion 202 that includes portions of the graphics pipeline 200 after rasterization.

The graphics pipeline 200 has access to storage resources 205 such as a hierarchy of one or more memories or caches that are used to implement buffers and store vertex data, texture data, and the like. In the illustrated embodiment, the storage resources 205 include load data store (LDS) 206 circuitry that is used to store data. The storage resources 205 also include one or more caches 207 that cache frequently used data. The cache 207 is used to implement a parameter buffer. As discussed herein, waves or wave groups that are executing on the shaders of the graphics pipeline 200 finish execution by writing results of processing the waves or wave groups into the caches 207. Shaders further down the graphics pipeline 200 can issue read requests to read information from the caches 207, such as the results of processing by waves or wave groups that previously finished execution on the shaders. The storage resources 205 are implemented using some embodiments of the system memory 105 shown in FIG. 1.

An input assembler 210 accesses information from the storage resources 205 that is used to define objects that represent portions of a model of a scene. An example of a primitive is shown in FIG. 2 as a triangle 211, although other types of primitives are processed in some embodiments of the graphics pipeline 200. The triangle 203 includes one or more vertices 212 that are connected by one or more edges 214 (only one of each shown in FIG. 2 in the interest of clarity). The vertices 212 are shaded during the geometry processing portion 201 of the graphics pipeline 200.

A vertex shader 215, which is implemented in software in the illustrated embodiment, logically receives a single vertex 212 of a primitive as input and outputs a single vertex. Some embodiments of shaders such as the vertex shader 215 implement massive single-instruction-multiple-data (SIMD) processing so that multiple vertices are processed concurrently. The graphics pipeline 200 implements a unified shader model so that all the shaders included in the graphics pipeline 200 have the same execution platform on the shared massive SIMD compute units. The shaders, including the vertex shader 215, are therefore implemented using a common set of resources that is referred to herein as the unified shader pool 216.

A hull shader 218 operates on input high-order patches or control points that are used to define the input patches. The hull shader 218 outputs tessellation factors and other patch data such as control points of the patches that are processed in the hull shader 218. The tessellation factors are stored in the storage resources 205 so they can be accessed by other entities in the graphics pipeline 200.

A tessellator 220 receives objects (such as patches) from the hull shader 218. In some embodiments, primitives generated by the hull shader 218 are provided to the tessellator 220. The tessellator 220 generates information identifying primitives corresponding to the input object, e.g., by tessellating the input objects based on tessellation factors generated by the hull shader 218. Tessellation subdivides input higher-order primitives such as patches into a set of lower-order output primitives that represent finer levels of detail, e.g., as indicated by tessellation factors that specify the granularity of the primitives produced by the tessellation process. A model of a scene is therefore represented by a smaller number of higher-order primitives (to save memory or bandwidth) and additional details are added by tessellating the higher-order primitive.

A domain shader 224 inputs a domain location and (optionally) other patch data. The domain shader 224 operates on the provided information and generates a single vertex for output based on the input domain location and other information. In the illustrated embodiment, the domain shader 224 generates primitives 222 based on the triangles 211 and the tessellation factors. The domain shader 224 launches the primitives 222 in response to completing processing.

A geometry shader 226 receives input primitives from the domain shader 224 and outputs up to four primitives (per input primitive) that are generated by the geometry shader 226 based on the input primitive. In the illustrated embodiment, the geometry shader 226 generates the output primitives 228 based on the tessellated primitive 222. Some embodiments of the geometry shader 226 generate wave groups (referred to herein as "GS wave groups") that are launched by a corresponding shader processor input (SPI, not shown in FIG. 2 in the interest of clarity). In response to finishing execution on the shader engines, the wave groups write the output back to the caches 207.

One stream of primitives is provided to one or more scan converters 230 and, in some embodiments, up to four streams of primitives are concatenated to buffers in the storage resources 205. The scan converters 230 perform shading operations and other operations such as clipping, perspective dividing, scissoring, and viewport selection, and the like. The scan converters 230 generate a set 232 of pixels that are subsequently processed in the pixel processing portion 202 of the graphics pipeline 200. Some embodiments of the scan converters 230 provide requests to read information from the caches 207, e.g., by transmitting the requests to an SPI implemented in the graphics pipeline 200.

In the illustrated embodiment, a pixel shader 234 inputs a pixel flow (e.g., including the set 232 of pixels) and outputs zero or another pixel flow in response to the input pixel flow. An output merger block 236 performs blend, depth, stencil, or other operations on pixels received from the pixel shader 234.

Some or all the shaders in the graphics pipeline 200 perform texture mapping using texture data that is stored in the storage resources 205. For example, the pixel shader 234 can read texture data from the storage resources 205 and use the texture data to shade one or more pixels. The shaded pixels are then provided to a display for presentation to a user.

Figure 3:
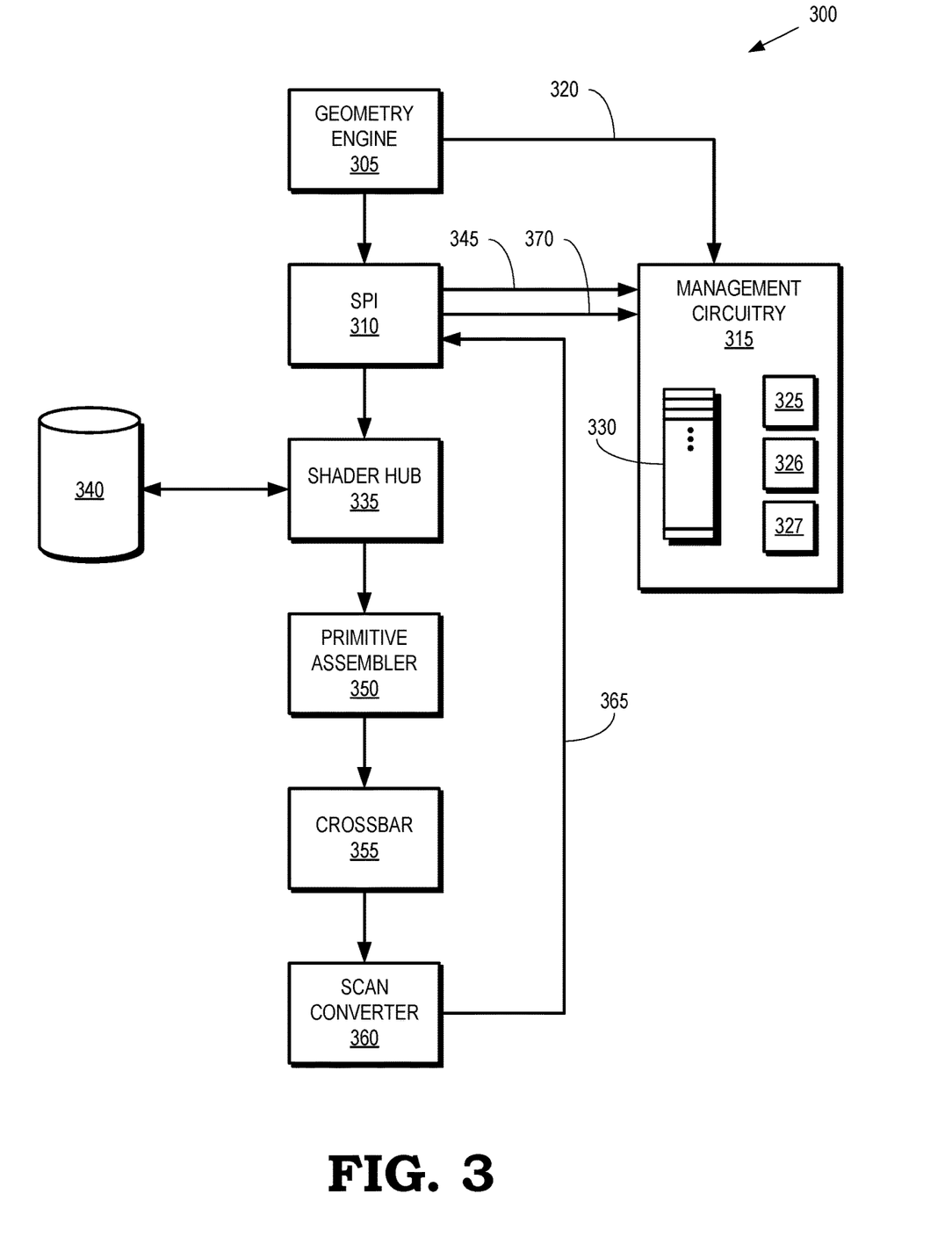
FIG. 3 is a block diagram of a portion of a graphics pipeline that selectively throttles waves or wave groups launched by a geometry shader according to some embodiments.

FIG. 3 is a block diagram of a portion of a graphics pipeline 300 that selectively throttles waves or wave groups launched by a geometry shader according to some embodiments. The graphics pipeline 300 is implemented in some embodiments of the processing system 100 shown in FIG. 1 and the graphics pipeline 200 shown in FIG. 2.

A geometry engine 305 generates waves or wave groups for a geometry shader. The waves or wave groups generated by the geometry engine 305 are therefore referred to as GS wave groups. However, in some embodiments, the waves or wave groups are generated by or for other shaders such as a vertex shader, in which case the waves or wave groups are referred to by other names such as VS wave groups. The geometry engine 305 provides the GS wave groups to an SPI 310 that selectively launches or throttles the GS wave groups, as discussed herein. The geometry engine 305 also provides information to management circuitry 315 to signal launch of the GS wave groups, as indicated by the arrow 320. The management circuitry 315 increments a first counter 325 in response to a launch event being written into a windowing buffer 330. The management circuitry 315 also decrements the first counter 325 in response to the launch event being read out of the windowing buffer 330.

The SPI 310 launches the GS wave groups for execution on one or more shaders in a shader hub 335. The GS wave groups are executed by the shader hub 335 and, in response to finishing execution, the GS wave groups write results to a cache 340. The shader hub 335 signals to the SPI 310 that the GS wave groups have finished execution in response to writing the results to the cache 340. The shader hub 335 transmits an indication of completion of the GS wave groups to the SPI 310, which transmits a signal (referred to herein as an "finished" signal or a "done" signal) to the management circuitry 315 to indicate that the GS wave groups have finished execution, as indicated by the arrow 345. The management circuitry 315 increments a second counter 326 in response to an execution finish event being written into the windowing buffer 330. The management circuitry 315 also decrements the second counter 326 in response to the execution finish event being read out of the windowing buffer 330.

A primitive assembler 350 generates primitives by processing the GS wave groups and provides the primitives to a crossbar 355 (also referred to as a primitive hub), which provides the assembled primitives to a scan converter 360. The scan converter 360 generates pixel shader (PS) waves for execution by the shaders in the shader hub 335. The scan converter 360 therefore signals the SPI 310, as indicated by the 365, and the SPI 310 can launch the PS waves for execution at the shader hub 335. The SPI 310 also generates read requests to read information from the cache 340 that is used by the shader hub 335 to process the PS waves. In response to generating the read request, the SPI 310 transmits a signal to the management circuitry 315 to indicate that the read request is pending for the cache 340, as indicated by the arrow 370. The management circuitry 315 increments a third counter 327 in response to a read request event being written into the windowing buffer 330. The management circuitry 315 also decrements the third counter 327 in response to the read request event being read out of the windowing buffer 330. The read requests do not go out of SPI 310 until the SPI 310 receives a "GS wave done" signal from the management circuitry 315.

Some embodiments of the management circuitry 315 selectively throttle lunches from the SPI 310 (or instruct the SPI 310 to selectively throttle the launches) based on a comparison of numbers of in-flight GS wave groups and pending PS waves. The management circuitry 315 determines a first number of in-flight first wave groups based on a difference between the first counter 325 and the second counter 326. The management circuitry 315 also determines a second number of PS waves pending execution on the shaders in the shader hub 335 based on a difference between the second counter 326 and the third counter 327. The management circuitry 315 throttles (or instructs the SPI 310 to throttle) the GS wave groups in response to the first number being lower than the second number. Some embodiments of the management circuitry 315 determine an additional "burstiness" factor that is applied to decrease the likelihood that throttling of the GS wave groups will starve the graphics pipeline 300 of work. The additional factor is determined based on estimates of the burstiness of the read requests associated with PS waves. In that case, the management circuitry 315 throttles (or instructs the SPI 310 to throttle) the GS wave groups in response to the first number being lower than the sum of the second number and the additional burstiness factor.

Figure 4:
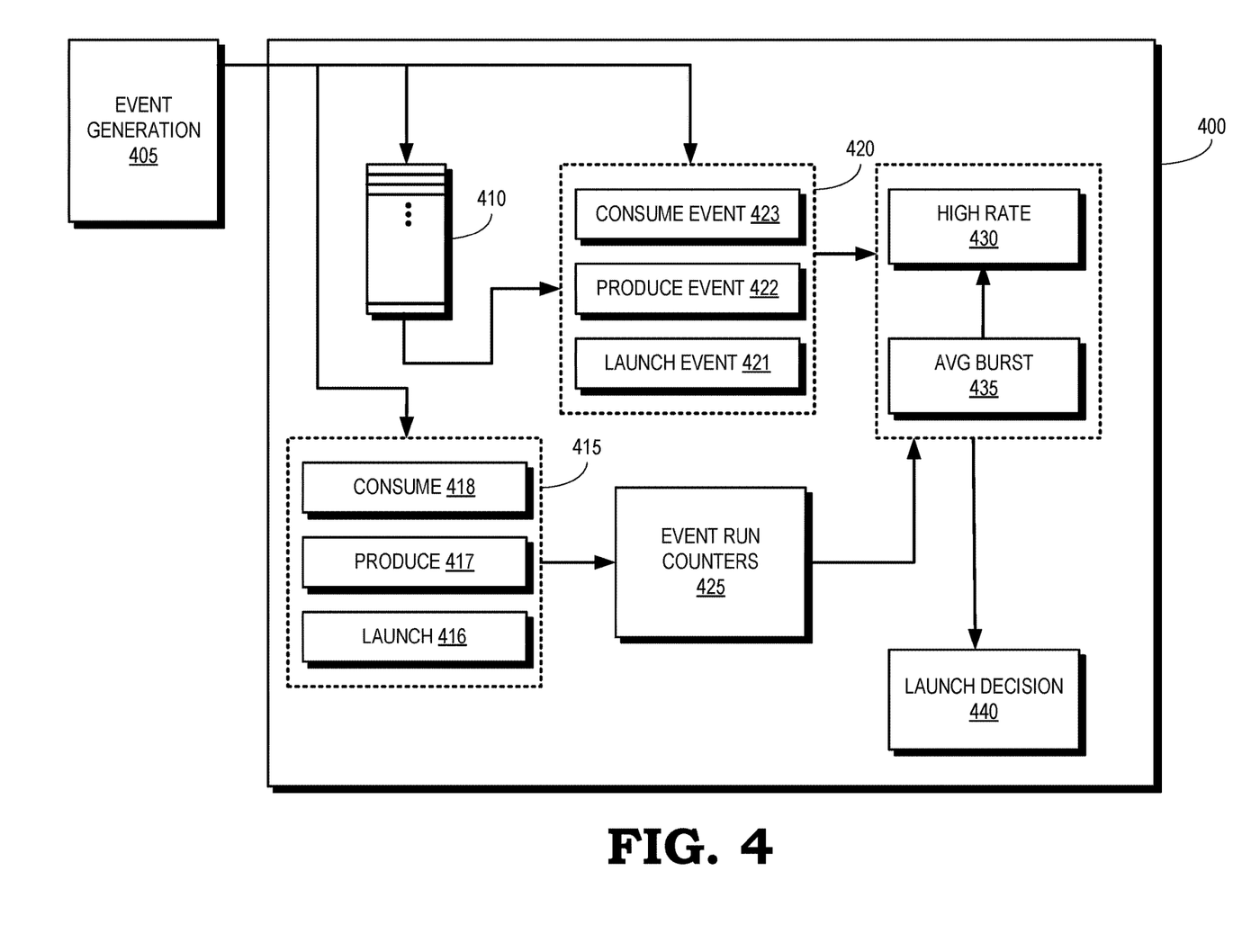
FIG. 4 is a block diagram of a first embodiment of management circuitry that selectively throttles waves or wave groups according to some embodiments.

FIG. 4 is a block diagram of a first embodiment of management circuitry 400 that selectively throttles waves or wave groups according to some embodiments. The first embodiment of the management circuitry 400 is used to implement some embodiments of the management circuitry 315 shown in FIG. 3. The management circuitry 400 receives information associated with events from event generation circuitry 405. In some embodiments, the information includes signaling indicating a launch event, a finish execution event, a read request event, and the like.

A windowing buffer 410 stores information representing the events in entries of the windowing buffer 410. Some embodiments of the windowing buffer 410 are implemented as a first-in-first-out (FIFO) buffer so that events received from the event generation circuitry 405 are added (or pushed) to entries at the tail of the windowing buffer 410 and removed (or popped) from entries at the head of the windowing buffer 410.

The management circuitry 400 includes a set 415 of counters that are used to count events in response to entries being added to the windowing buffer 410. In the illustrated embodiment, the set 415 includes a launch counter 416 that counts GS waves or wave groups that are launched for execution in one or more shaders, a produce counter 417 that counts GS waves or wave groups that finish executing by writing to a cache, and a consume counter 418 that counts read requests to the cache, e.g., for a PS wave. The launch counter 416, the produce counter 417, and the consume counter 418 are incremented in response to a corresponding event being added to the windowing buffer 410. The counters 416-418 in the set 415 reset to 0 (or other predetermined value) when idle.

The management circuitry 400 also includes a set 420 of counters that are used to count numbers of launch, produce, and consume events that are included in the windowing buffer 410. The set 420 includes a launch event counter 421 that increments by a number of launch events being written to the windowing buffer 410 and decrements by a number of launch events being read from the windowing buffer 410. The set 420 also includes a produce event counter 422 that increments by a number of produce events being written to the windowing buffer 410 and decrements by a number of produce events being read from the windowing buffer 410. The set 420 further includes a consume event counter 423 that increments by a number of consume events being written to the windowing buffer 410 and decrements by a number of consume events being read from the windowing buffer 410.

The management circuitry 400 further includes event run counters 425 for each of the events types, e.g., launch events, produce events, and consume events. The event run counters 425 count the burstiness of each event. An event run counter 425 for an event increments by one every time the event run is broken on the write-side of the windowing buffer 410. For example, if there are 50 launch events without any produce events or consume events, a LaunchRunCounter in the event run counters 425 is incremented by one. If after the 50 launches there are 50 launch events and 50 produce events in next 50 cycles, the LaunchRunCounter has a value of 51 and the ProduceRunCounter has a value of 50.

The management circuitry 400 uses values of the counters 415, 420, 425 to calculate parameters that indicate the burstiness of the events. Average burst circuitry 430 calculates a per-event metric:

AverageBurst=EventCount/EventRunCount.

High-rate circuitry 435 calculates another per-event metric:

HighRate=EventCount+Event>AverageBurst.

The values generated by the average burst circuitry 430 and the high-rate circuitry 435 are provided to launch decision circuitry 440, which uses this information in combination with the values of the counters 415, 420, 425 to selectively throttle the launch of GS waves or wave groups.

Some embodiments of the launch decision circuitry 440 selectively throttle the launch of GS waves or wave groups based on a comparison of in-flight GS work and pending PS work. The in-flight GS work (WorkInFlight) is estimated based on a difference between values in the launch counter 416 and the produce counter 417. The pending PS work (WorkReady) is estimated based on a difference between values in the produce counter 417 and the consume counter 418. The launch decision circuitry 440 throttles the launch of GS waves or wave groups if the in-flight GS work is larger than the pending PS work. In some embodiments, the launch decision circuitry 440 throttles the launch of the GS waves or wave groups if the following criterion is satisfied:

WorkInFlight>WorkReady+HighRate[Read]

The additional factor (HighRate[Read]) is included to account for the potential burstiness of the pending PS work, e.g., the read requests for the PS waves.

Figure 5:
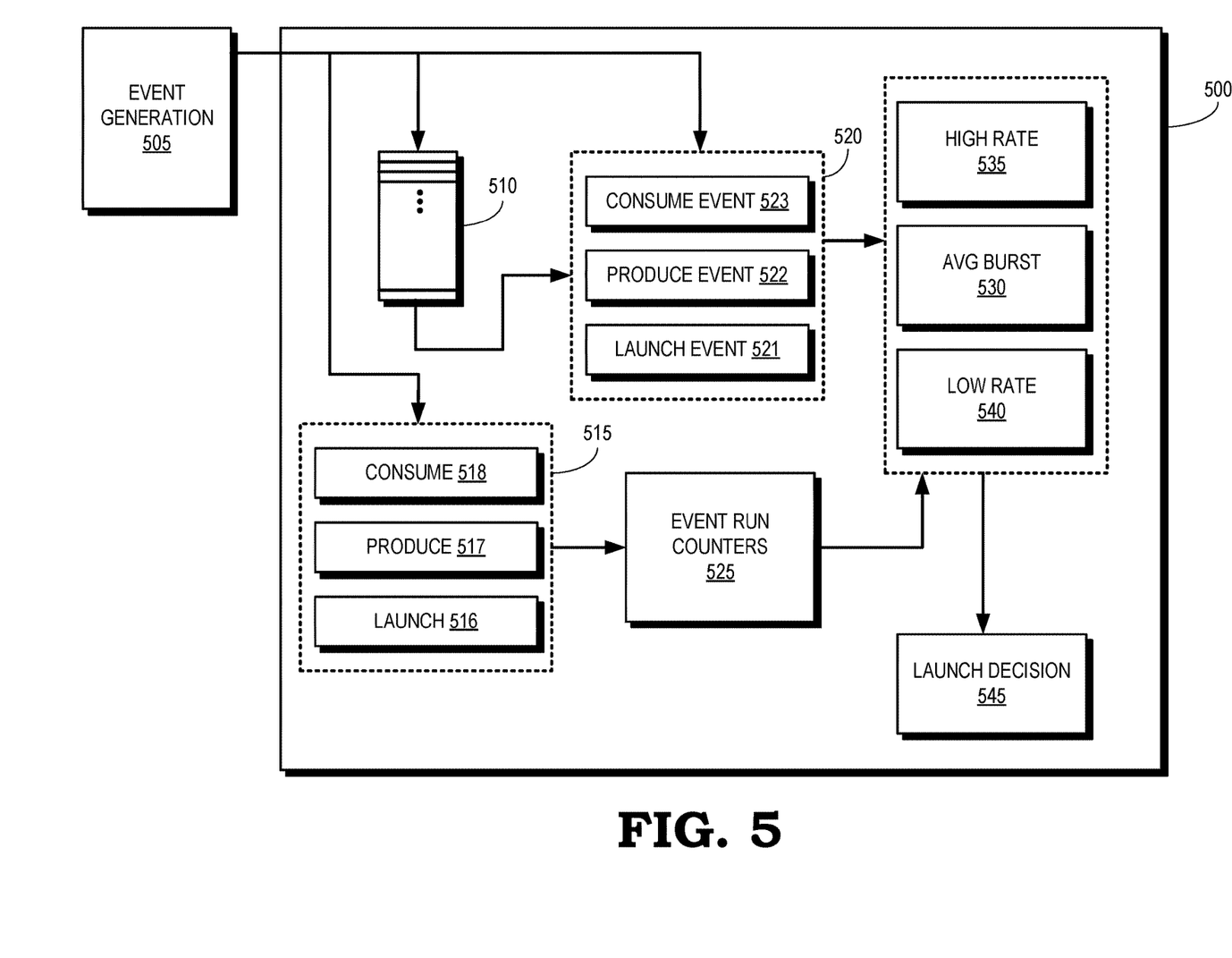
FIG. 5 is a block diagram of a second embodiment of management circuitry that selectively throttles waves or wave groups according to some embodiments.

FIG. 5 is a block diagram of a second embodiment of management circuitry 500 that selectively throttles waves or wave groups according to some embodiments. The second embodiment of the management circuitry 500 is used to implement some embodiments of the management circuitry 315 shown in FIG. 3. The management circuitry 500 receives information associated with events from event generation circuitry 505. In some embodiments, the information includes signaling indicating a launch event, a finish execution event, a read request event, and the like. The management circuitry 500 includes a set 515 of counters that are used to count events in response to entries being added to a windowing buffer 510. The set 515 includes a launch counter 516, a produce counter 517, and a consume counter 518. The management circuitry 500 also includes a set 520 of counters 521, 522, 523 that are used to count numbers of launch, produce, and consume events that are included in the windowing buffer 510. Event run counters 525 count the burstiness of each event including launch events, produce events, and consume events.

The management circuitry 500 uses values of the counters 515, 520, 525 to calculate parameters that indicate the burstiness of the events. Average burst circuitry 530 calculates a per-event metric:

AverageBurst=EventCount/EventRunCount.

High-rate circuitry 535 calculates another per-event metric:

HighRate=EventCount+EventAverageBurst.

Low-rate circuitry 540 calculates another per-event metric:

LowRate=EventCount−EventAverageBurst.

The values generated by the average burst circuitry 530, the high-rate circuitry 535, and the low-rate circuitry 540 are provided to launch decision circuitry 545, which uses this information in combination with the values of the counters 515, 520, 525 to selectively throttle the launch of GS waves or wave groups.

Some embodiments of the launch decision circuitry 545 selectively throttle the launch of GS waves or wave groups based on a comparison of in-flight GS work and pending PS work. The in-flight GS work (WorkInFlight) is estimated based on a difference between values in the launch counter 516 and the produce counter 517. The pending PS work (WorkReady) is estimated based on a difference between values in the produce counter 517 and the consume counter 518. In the illustrated embodiment, the launch decision circuitry 545 defines a rate of consumption as:

ConsumeRate=HighRate[Consume]−LowRate[Produce]

The launch decision circuitry 545 then estimates or forecasts the amount of work that is ready, e.g., using the definition:

ReadyForecast=WorkReady−ConsumeRate

The launch decision circuitry 545 throttles the launch of the GS waves or wave groups if the following criterion is satisfied:

WorkInFlight>LowRate[Launch]−ReadyForecast

If this criterion is not satisfied, additional GS waves or wave groups are launched.

Figure 6:
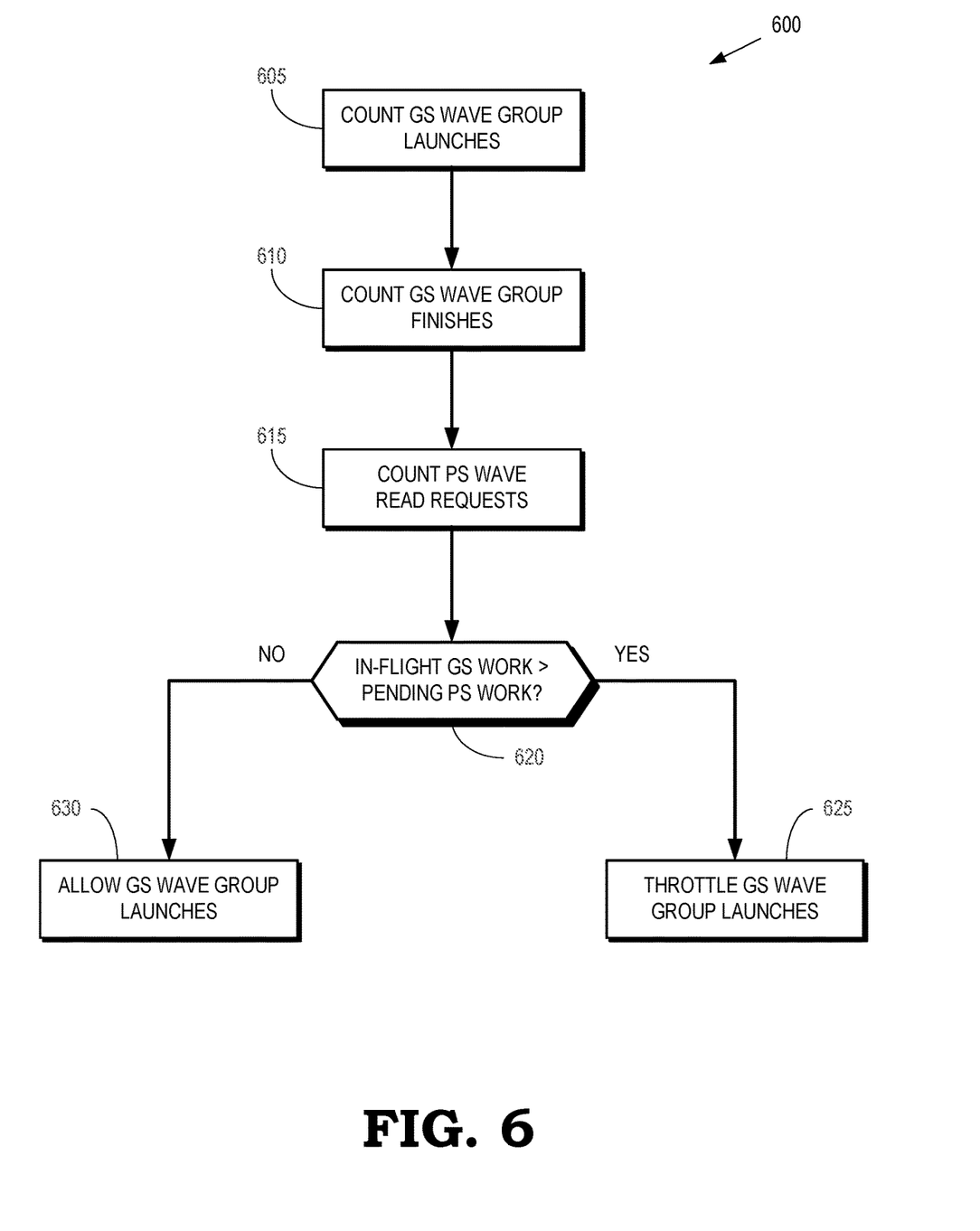
FIG. 6 is a flow diagram of a method of selectively launching geometry shader waves or wave groups according to some embodiments.

FIG. 6 is a flow diagram of a method 600 of selectively launching GS waves or wave groups according to some embodiments. The method 600 is implemented in some embodiments of the processing system 100 shown in FIG. 1, the graphics pipeline 200 shown in FIG. 2, the graphics pipeline 300 shown in FIG. 3, the management circuitry 400 shown in FIG. 4, and the management circuitry 500 shown in FIG. 5.

At block 605, the management circuitry counts GS wave group launches. At block 610, the management circuitry counts GS wave group finishes. At block 615 the management circuitry counts read requests for PS waves. At decision block 620, the management circuitry compares the amount of in-flight GS work (determined based on the number of GS wave group launches and finishes) to the amount of pending PS work (determined based on the number of GS wave group finishes and read requests for PS waves). In some embodiments, the management circuitry compares the amount of in-flight GS work to the sum of the amount of pending PS work and an additional factor to account for the burstiness of the PS work, as discussed herein. If the in-flight GS work exceeds the pending PS work (perhaps augmented by the additional factor), the method 600 flows to the block 625 and the management circuitry throttles launching of GS wave groups. If the in-flight GS work is less than the pending PS work (perhaps augmented by the additional factor) the method 600 flows to the block 630 and the management circuitry does not throttle launches of GS wave groups.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
a first shader configured to generate first wave groups;
a shader processor input (SPI) configured to launch the first wave groups; and
a scan converter configured to generate second waves based on results of processing the first wave groups in at least one second shader, wherein the first wave groups are selectively throttled based on a comparison of in-flight first wave groups and second waves pending execution on the at least one second shader.

2. The apparatus of claim 1, further comprising:
a cache configured to hold information stored in response to the first wave groups finishing execution on the at least one second shader, wherein the information is read by corresponding second waves.

3. The apparatus of claim 2, further comprising:
a first counter configured to count launches of the first wave groups;
a second counter configured to count the first wave groups that have finished executing on the at least one second shader by writing to the cache; and
a third counter configured to count requests from the second waves to read from the cache.

4. The apparatus of claim 3, wherein the first, second, and third counters are incremented in response to a launch event, an execution finish event, and a read request event, respectively, being written into a windowing buffer.

5. The apparatus of claim 4, wherein the first, second, and third counters are decremented in response to the launch event, the execution finish event, and the read request event, respectively, being read out of the windowing buffer.

6. The apparatus of claim 5, further comprising:
management circuitry configured to determine a first number of in-flight first wave groups based on a difference between the first counter and the second counter and to determine a second number of second waves pending execution on the at least one second shader based on a difference between the second counter and the third counter.

7. The apparatus of claim 6, wherein the management circuitry is configured to throttle the first wave groups launched by the SPI in response to the first number being lower than the second number.

8. The apparatus of claim 7, wherein the management circuitry is configured to throttle the first wave groups launched by the SPI in response to the first number being lower than the second number plus an additional factor that is estimated based on burstiness of read requests associated with the second waves.

9. The apparatus of claim 8, wherein the management circuitry is configured to determine the additional factor to decrease a likelihood that throttling starves a graphics pipeline of work.

10. A method comprising:
generating, at a first shader, first wave groups for launch by a shader processor input (SPI);
generating, at a scan converter, second waves based on results of processing the first wave groups in at least one second shader; and
selectively throttling the first wave groups based on a comparison of in-flight first wave groups and second waves pending execution on the at least one second shader.

11. The method of claim 10, further comprising:
writing information to a cache in response to the first wave groups finishing execution on the at least one second shader, wherein the information is read by corresponding second waves.

12. The method of claim 11, further comprising:
counting, at a first counter, launches of the first wave groups;
counting, at a second counter, the first wave groups that have finished executing on the at least one second shader by writing to the cache; and
counting, at a third counter, requests from the second waves to read from the cache.

13. The method of claim 12, further comprising:
writing a launch event to a windowing buffer, wherein counting the launches of the first wave groups comprises incrementing the first counter in response to writing the launch event to the windowing buffer; and
reading the launch event from the windowing buffer, wherein counting the launches of the first wave groups comprises decrementing the first counter in response to reading the launch event from the windowing buffer.

14. The method of claim 13, further comprising:
writing an execution finish event to the windowing buffer, wherein counting the first wave groups that have finished executing comprises incrementing the second counter in response to writing the execution finish event to the windowing buffer; and reading the execution finish event from the windowing buffer, wherein counting the first wave groups that have finished executing comprises decrementing the second counter in response to reading the execution finish event from the windowing buffer.

15. The method of claim 13, further comprising:
writing a read request event to the windowing buffer, wherein counting the requests from the second waves comprises incrementing the third counter in response to writing the read request event to the windowing buffer; and
reading the read request event from the windowing buffer, wherein counting the requests from the second waves comprises decrementing the third counter in response to reading the read request event from the windowing buffer.

16. The method of claim 15, further comprising:
determining a first number of in-flight first wave groups based on a difference between the first counter and the second counter; and
determining a second number of second waves pending execution on the at least one second shader based on a difference between the second counter and the third counter.

17. The method of claim 16, wherein selectively throttling the first wave groups comprises throttling the first wave groups launched by the SPI in response to the first number being lower than the second number.

18. The method of claim 17, wherein selectively throttling the first wave groups comprises throttling the first wave groups launched by the SPI in response to the first number being lower than the second number plus an additional factor that is estimated based on burstiness of read requests.

19. The method of claim 18, further comprising:
determining the additional factor to decrease a likelihood that throttling starves a graphics pipeline of work.

20. An apparatus comprising:
a first shader configured to generate first wave groups;
a scan converter configured to generate second waves based on results of processing the first wave groups in at least one second shader; and
a cache configured to hold information stored in response to the first wave groups finishing execution on the at least one second shader, wherein the first wave groups are selectively throttled based on a comparison of a first number of the first wave groups that have been launched and have not finished execution by writing to the cache and a second number of read requests to the cache from second waves pending execution on the at least one second shader.

* * * * *